United States Patent [19]

Curtis

[11] Patent Number: 5,110,176
[45] Date of Patent: May 5, 1992

[54] AUTOMOTIVE SIDE IMPACT PROTECTION APPARATUS

[75] Inventor: Cass V. Curtis, Dover, N.H.

[73] Assignee: Davidson Textron Inc., Dover, N.H.

[21] Appl. No.: 719,923

[22] Filed: Jun. 24, 1991

[51] Int. Cl.⁵ .............................................. B62D 25/05
[52] U.S. Cl. .................................... 296/188; 296/146; 296/63
[58] Field of Search ................... 296/188, 146, 63, 65, 296/68.1

[56] References Cited

U.S. PATENT DOCUMENTS

| | | | |
|---|---|---|---|
| 4,231,607 | 11/1980 | Bohlin | 296/63 |
| 4,451,078 | 5/1984 | Malda | 296/188 |
| 4,934,751 | 6/1990 | Shimoda | 296/188 |
| 5,000,509 | 3/1991 | Sinnhuber et al. | 296/188 |

Primary Examiner—Robert R. Song
Attorney, Agent, or Firm—John P. Moran

[57] ABSTRACT

An automotive side impact protection apparatus including a face plate formed on the inner lower portion of the door, and reinforcement structure operatively connected to the underbody and interfacing with the face plate. In one embodiment, the reinforcement structure is a cantilevered brace extending diagonally upwardly from the underbody intermediate the seat and the face plate. In another embodiment, the reinforcement structure is a reinforcement member extending laterally through the seat just inside the bottom surface thereof, with an enlarged portion formed on the outboard portion of the member adjacent the face plate, and reinforcement trusses between the member and the underbody.

4 Claims, 2 Drawing Sheets

AUTOMOTIVE SIDE IMPACT PROTECTION APPARATUS

TECHNICAL FIELD

This invention relates generally to automotive side impact protection apparati and, more particularly, to such an apparatus which transmits any forces from side impacts from the door to the underbody, bypassing the seat proper.

BACKGROUND ART

Side impact protection apparati are known. For example, Boblin U.S. Pat. No. 4,231,607 discloses two transverse pipes of steel or aluminum extending across the entire width of a bench type seat, or across each of a pair of individual or "bucket" seats with a closely adjacent tubular reinforcement intermediate the seats. The pipes extend across the approximate mid height of the seat(s). A plastically deformable energy absorbing member of polyurethane foam is mounted in each of the oppositely disposed doors and adapted to abut against the adjacent outboard end of the pipes when the door is closed. The seats are anchored on spaced-apart supporting members mounted on the underbody. In this arrangement a side impact is transferred substantially laterally across the seats intermediate the oppositely disposed doors and not directly to the underbody.

DISCLOSURE OF THE INVENTION

A general object of the invention is to provide an improved automotive side impact protection apparatus.

Another object of the invention is to provide an automotive side impact protection apparatus wherein any side impact forces are transmitted substantially directly to the underbody.

A further object of the invention is to provide an automotive impact protection apparatus including a face plate formed on the lower inner portion of the door and having a vertical inner face formed thereon, and reinforcement structure operatively connected to the underbody with a vertical outboard face adapted to interface with the vertical inner face when the door is closed.

Still another object of the invention is to provide such a reinforcement structure consisting of a cantilevered brace mounted on the underbody and extending upwardly and outwardly intermediate the seat and the face plate.

A still further object of the invention is to provide an alternate embodiment of the reinforcement structure consisting of a reinforcement member mounted in and across the width of the seat just inside the bottom surface thereof, and spaced-apart seat reinforcement trusses between the reinforcement member and the underbody.

These and other objects and advantages will become more apparent when reference is made to the following drawings and the accompanying description.

BEST MODE OF CARRYING OUT THE INVENTION

Figure 1:
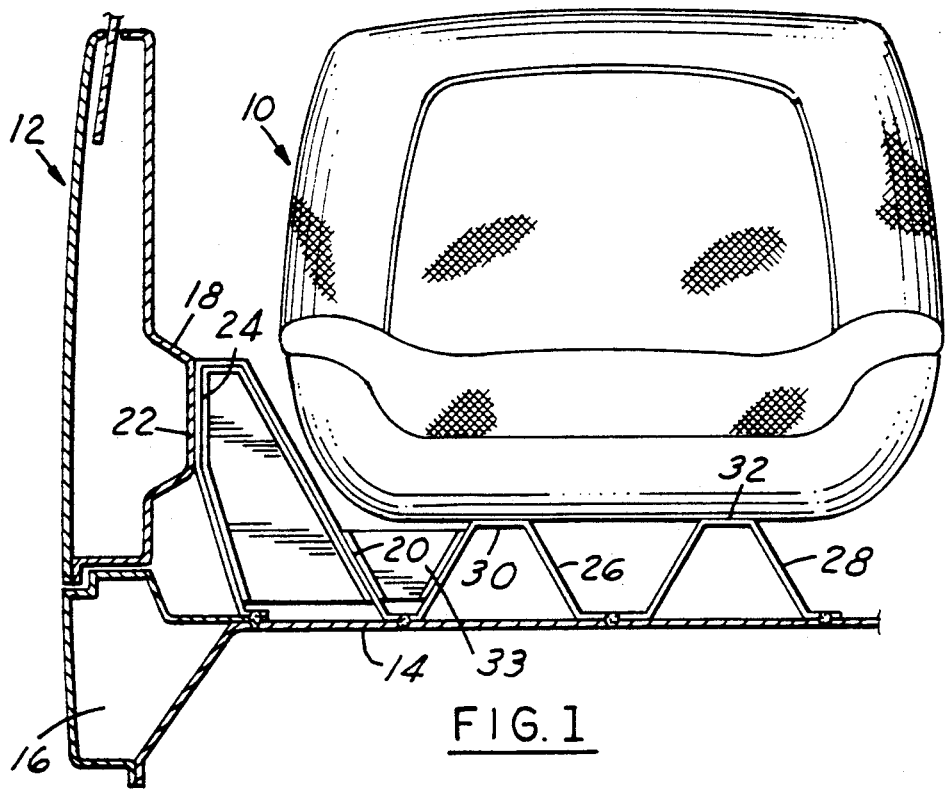
FIG. 1 is front view of one embodiment of the invention operatively connected among an automotive door, seat, and underbody.

Referring now to the drawings in greater detail, FIG. 1 illustrates an automotive individual or "bucket" seat 10 inside a door 12 and above an underbody 14. A rocker panel 16 is located below the door 12 at the outer end of the underbody 14.

A face plate 18 is formed on a lower inner portion of the door 12. A cantilevered brace 20 extends upwardly and outwardly from the underbody 14 intermediate the side of the seat 10 and the face plate 18, such that an interface exists between a vertical outer face 24 of the brace 20 and a vertical inner face 22 of the face plate 18 when the door 12 is closed. The length of the brace 20 is such that it extends from the back of the seat 10 to a point approximately 3 inches from the front of the seat to permit entry into and egress from the vehicle by the operator or passenger.

Figure 2:
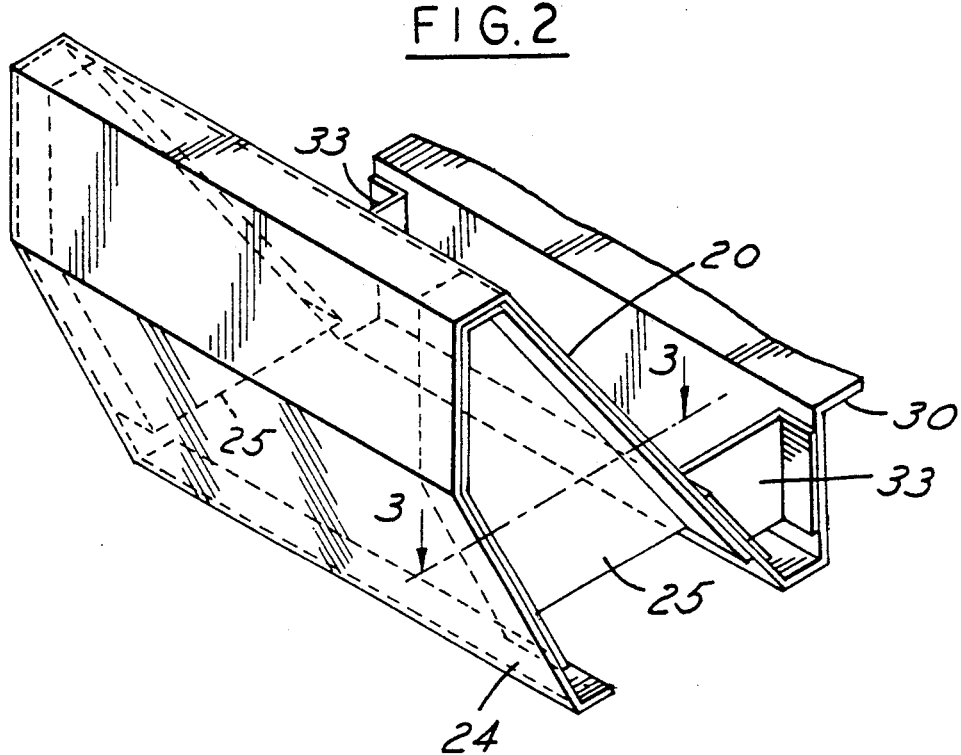
FIG. 2 is a perspective view of a portion of the FIG. 1 structure.
Figure 3:
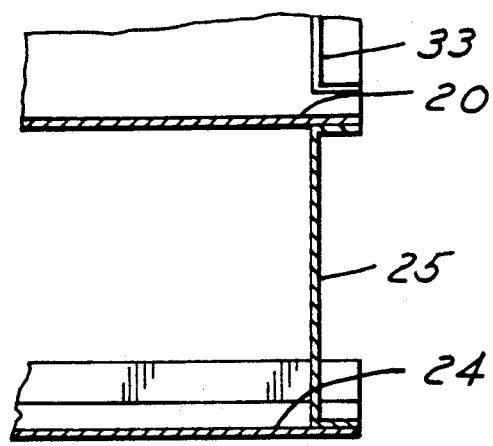
FIG. 3 is a cross-sectional view taken along the plane of the line 3—3 of FIG. 2, and looking in the direction of the arrows.

As shown in FIGS. 2 and 3, flanged reinforcement members 25 are secured within each of the rear and front ends of the cantilevered brace 20.

A pair of spaced-apart seat reinforcement trusses 26 and 28 mounted on the underbody 14 serve to support the seat 10 at their respective upper surfaces 30 and 32. At least one stiffener member 33, having a frustro-conical shaft, is fixedly secured between the reinforcement truss 26 and the cantilevered brace 20 to prevent rotation of the brace 20 toward the seat 10 upon a side impact.

In the event of an external side impact, the resultant forces would be transmitted through the door 12, the interface 22/24, the cantilevered brace 20, to the underbody 14. Thus, the impact forces are directed away from the seat 10 and any passenger or operator sitting thereon.

Figure 4:
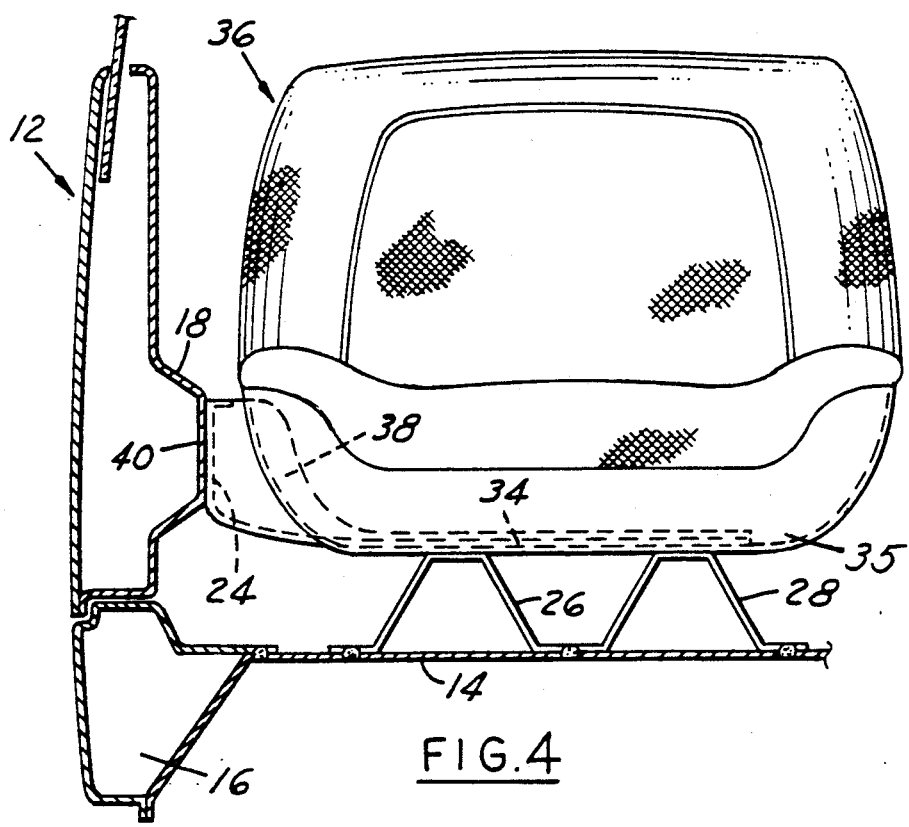
FIG. 4 is a front view of a second embodiment of the invention operatively connected among the automotive door, seat, and underbody.

Referring now to FIG. 4, in lieu of the cantilevered brace 20, a seat inner reinforcement member 34 is secured to the bottom structure 35 of an automotive bucket seat 36, just inside the bottom surface thereof and across the width of the seat 36. The seat bottom structure 35, in turn, is secured to the tops of the spaced reinforcement trusses 26 and 28. An enlarged outboard portion 38 of the inner reinforcement member 34 terminates in a vertical face 24 engaging the vertical inner face 40 of the face plate 18 when the door 12 is closed.

In this embodiment, an external side impact force would be transmitted through the door 12, the interface 24/40, the inner reinforcement member 34, the seat reinforcement trusses 26 and 28, to the underbody 14. Thus, the impact forces are directed through the seat inner reinforcement member 34, but away from any passenger or operator sitting on the seat 36.

INDUSTRIAL APPLICABILITY

It should be apparent that the invention provides improved alternate embodiments of automotive side impact protection apparati, which serve to transmit any forces from side impacts from the door substantially to the underbody, bypassing the seat proper.

It should also be apparent that opposite hand versions of these embodiments would be used for the other, or passenger side, of the vehicle.

While but two embodiments have been shown and described, other modifications thereof are possible within the scope of the following claims.

I claim:

1. A side impact protection apparatus for use with an automotive door and a seat mounted on seat reinforcement trusses on an underbody, said apparatus comprising a face plate formed on the lower inner portion of the door and having a vertical inner face, and reinforcement means having a vertical outboard face for interfacing with said vertical inner face of said face plate when said door is closed and secured to said seat reinforcement trusses.

2. The side impact protection apparatus described in claim 1, wherein said reinforcement means includes a cantilevered brace extending upwardly and outwardly from the underbody intermediate the seat and the face plate.

3. The side impact protection apparatus described in claim 2, and further comprising two spaced-apart longitudinally oriented seat reinforcement trusses fixedly secured between said underbody and said seat, and at least one stiffener member fixedly secured between said cantilevered brace and the adjacent seat reinforcement truss.

4. The side impact protection apparatus described in claim 1, wherein said reinforcement means includes a reinforcement member mounted in said seat and extending laterally across the bottom surface thereof, and secured on top of said seat reinforcement trusses, and an enlarged portion formed on the outboard end of said reinforcement member terminating adjacent said vertical outboard face.

* * * * *